L. P. BLOT.
CHUCK.
APPLICATION FILED SEPT. 2, 1914.

1,175,879.

Patented Mar. 14, 1916.

WITNESSES:
Louis Lucia.
Anne E. O'Brien.

INVENTOR:
Lucien P. Blot:
BY
HIS ATTORNEY.

THE COLUMBIA PLANOGRAPH CO., WASHINGTON, D. C.

UNITED STATES PATENT OFFICE.

LUCIEN P. BLOT, OF SOUTHINGTON, CONNECTICUT, ASSIGNOR TO THE PECK, STOW & WILCOX COMPANY, OF SOUTHINGTON, CONNECTICUT, A CORPORATION OF CONNECTICUT.

CHUCK.

1,175,879. Specification of Letters Patent. Patented Mar. 14, 1916.

Application filed September 2, 1914. Serial No. 859,786.

*To all whom it may concern:*

Be it known that I, LUCIEN P. BLOT, a citizen of the United States, and a resident of Southington, in the county of Hartford, State of Connecticut, have invented certain new and useful Improvements in Chucks, of which the following is a specification.

The object of this invention is to simplify and cheapen the construction and reduce the number of parts in a device of the character described.

Figure 1:
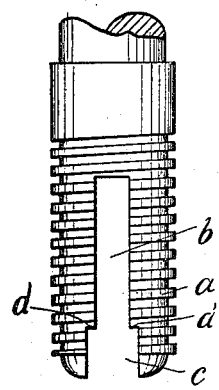
Figure 2:
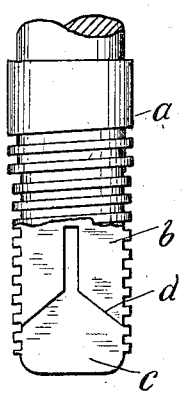
Figure 4:
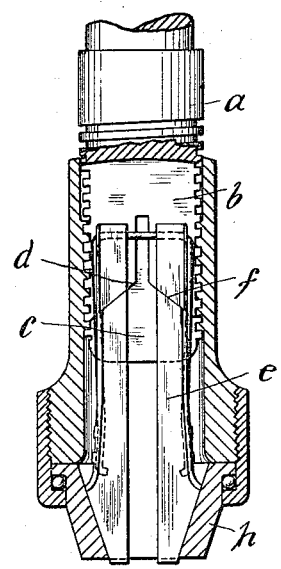
Figure 3:
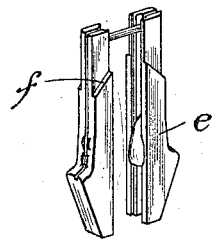

Figure 1 is a side elevation of a spindle embodying my invention. Fig. 2 is a section on the line 2—2 of Fig. 1. Fig. 3 is a side view of the jaws. Fig. 4 is a section similar to Fig. 2 but showing the jaw-closing sleeve and the jaws.

In chucks of the type with which this invention is concerned the spindle is transversely slotted to a sufficient depth to receive the jaws, and my invention is concerned with provision of means formed integrally with the spindle and comprising oppositely inclined shoulders on both walls of the slot to coöperate with similar shoulders on the sides of the jaws to cause or permit the said jaws as they are being closed to assume and maintain a position of approximate parallelism.

Referring to the drawings, *a* denotes the spindle, which is transversely slotted as at *b*, the end of the slot, indicated at *c*, being of greater width than the inner portion of the slot, forming the shoulders *d*, *d*, in each face of the slot, these shoulders being inclined and converging, as clearly shown in Fig. 2.

*e* denotes the jaws, the lower ends of which are of a width to fit the narrow slot, and the outer ends of a width to fit the larger slot. They are provided at opposite sides with the inclined shoulders *f*, which ride upon the inclined shoulders in the faces of the slots. The outer ends of the jaws are of usual construction and are engaged by a closing sleeve *h* which has threaded engagement with the exterior of the spindle. By screwing the sleeve onto the spindle the outer ends of the jaws are closed together, and the jaws are at the same time set back onto the shoulders, and the incline of the shoulders tends to cause the inner ends of the jaws to move toward one another, thus causing the two jaw members to assume and maintain parallel relations under certain conditions.

I am aware that it has been proposed heretofore to provide the jaws with inclined shoulders which coöperate with inclined shoulders formed on a piece which is separate from the spindle. The herein described invention consists in providing two transverse slottings of the spindle in the same plane, but one slot being of greater width than the other, thus making the shoulders integral with the spindle and avoiding the necessity of utilizing an additional part.

I claim as my invention:

1. In a device of the character described, a spindle provided with a transverse slot and inclined converging shoulders in each face and intermediate the length of the slot formed integrally with the said spindle, in combination with jaws having suitably inclined shoulders at each side to coöperate with the inclined shoulders of the spindle.

2. A chuck spindle of the character described transversely slotted, the walls of said slot being provided at corresponding points intermediate their length with oppositely inclined integral shoulders.

LUCIEN P. BLOT.

Witnesses:
L. E. TICHTHORN,
R. G. ANDREWS.

Copies of this patent may be obtained for five cents each, by addressing the "Commissioner of Patents, Washington, D. C."